United States Patent Office 3,140,170
Patented July 7, 1964

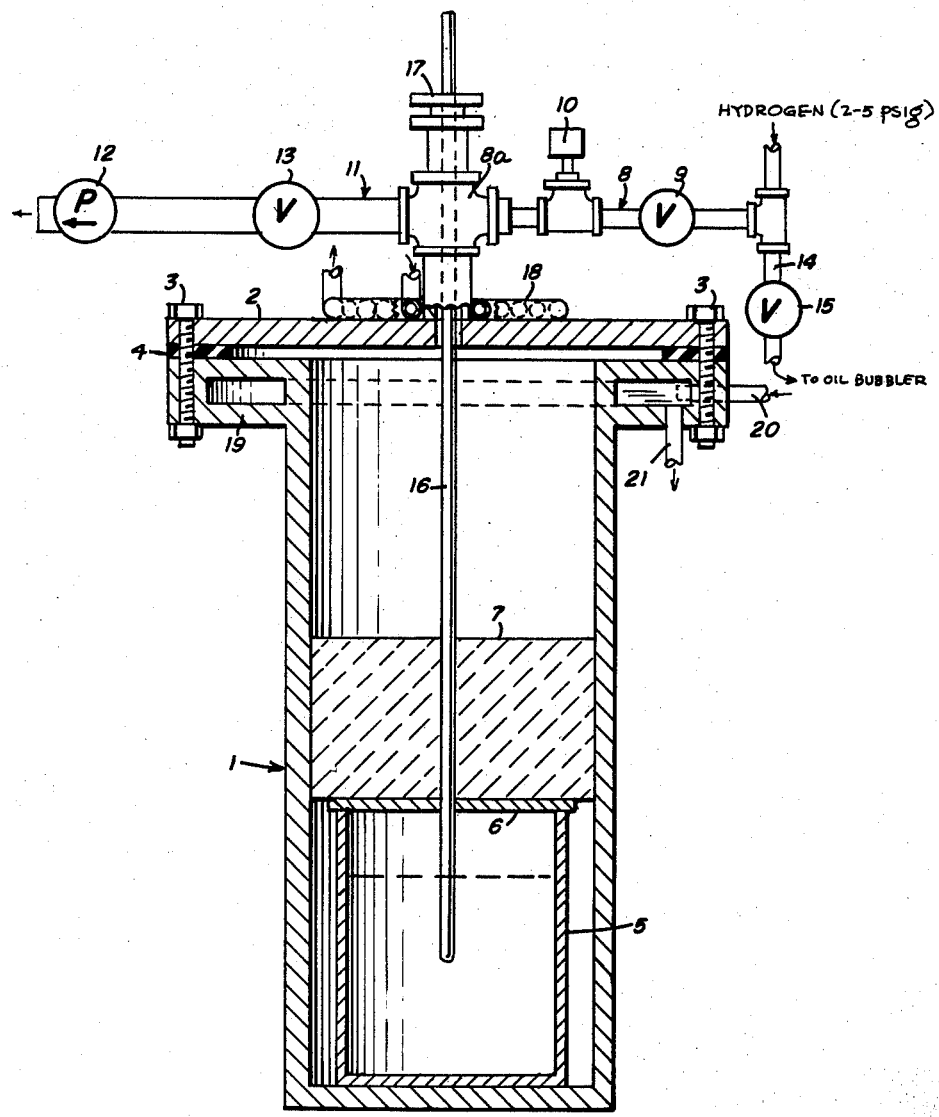

3,140,170
MAGNESIUM REDUCTION OF TITANIUM OXIDES IN A HYDROGEN ATMOSPHERE
Thomas A. Henrie, Henry Dolezal, and Ernst K. Kleespies, Boulder City, Nev., assignors to the United States of America as represented by the Secretary of the Interior
Filed Nov. 23, 1962, Ser. No. 239,855
12 Claims. (Cl. 75—84)
(Granted under Title 35, U.S. Code (1952), sec. 266)

The invention herein described and claimed may be manufactured and used by or for the Government of the United States of America for governmental purposes without the payment of royalties thereon or therefor.

This invention is concerned with the preparation of impure titanium metal in a form suitable for use in ferroalloys and as a source material for production of pure titanium metal.

High purity titanium metal may be prepared by electrorefining of titanium using a fused $TiCl_2$—$NaCl$ electrolyte. This process requires a titanium of low oxygen content. The $TiCl_2$—$NaCl$ cell will not refine titanium containing more than 14.3 percent oxygen and the effect of each percent oxygen is equivalent to a 7 percent reduction in the amount of titanium which can be converted electrolytically. Preparation of an impure titanium of low oxygen content can, therefore, greatly facilitate recovery of the pure metal by electrorefining.

Impure titanium metal is prepared by reduction of titanium oxides. Previous processes have employed magnesium as the reducing metal with a flux to facilitate transfer of oxygen. These processes, however, gave products having undesirably high oxygen contents as well as containing as much as 2 percent of alloyed magnesium which could not be removed by leaching.

It is therefore an object of the present invention to provide a process for reduction of titanium oxides to give a product low in oxygen and alloyed magnesium, suitable for use in an electrorefining process.

It has now been found that this objective may be achieved by reduction of titanium oxides with magnesium metal in the presence of a flux and in an atmosphere of hydrogen.

The mechanism of the reaction is believed to involve a transfer of oxygen by means of the hydrogen gas according to the following equations:

$$TiO_2(s) + 2H_2(g) + xH_2(g) \rightarrow 2H_2O(g) + Ti(H)_{2x}(s)$$

(where $x$ varies from 0.7 to 1.0 depending on the hydrogen pressure) and $$2H_2O(g) + 2Mg(s) \rightarrow 2H_2(g) + 2MgO(s)$$

The over-all reaction reduces to:

$$TiO_2(s) + xH_2(g) + 2Mg(s) \rightarrow 2MgO(s) + Ti(H)_{2x}(s)$$

The presence of the hydrogen and resultant formation of titanium hydride is essential to the formation of a product of low oxygen content according to the process of the invention.

MgO formed in the reduction adheres to the product and is easily removed along with unreacted magnesium metal and flux by acid leaching. Hydrogen and alloyed magnesium contained in the product titanium are removed therefrom by heating under vacuum at temperatures between 700° and 1000° C. The resulting sintered product is dense and non-pyrophoric, does not disintegrate while melting, has an oxygen content as low as 2.23 percent and is in a physical form ideal for use as an anode material in an electrorefining cell.

The following examples will serve to more particularly describe the invention.

The figure is a view partly in section illustrating the apparatus employed in the examples.

The apparatus comprises a 4-inch stainless steel reactor 1 having cover 2, also of 4-inch stainless steel, secured to reactor 1 by means of bolts 3 and rubber gasket 4. The charge is contained in a mild steel liner 5, 3 inches in diameter and four inches high and having lid 6, also of mild steel. Insulation 7 is located immediately above lid 6. Cover 2 is fitted with line 8 for supplying hydrogen to the reactor via needle valve 9. Vacuum detector 10 is also fitted to line 8. Line 11 connects to vacuum pump 12 via vacuum valve 13. Line 14 connects via needle valve 15 to an oil bubbler (not shown in drawing). Joining lines 11 and 8 is fitting 8a which also contains thermocouple well 16 with associated thermocouple packing gland 17. Cooling coil 18 is seated on cover 2, and cooling liquid circulates therethrough. Reactor 1 is provided with a hollow flange 19 through which cooling water is pumped by means of connections 20 and 21.

The insulation 7 between the reactor lid and the charge serves two purposes: (1) It assures a more uniform temperature in the charge by reducing the loss of heat by radiation to the cold reactor lid, and (2) it acts as a diffusion barrier which greatly reduces losses of magnesium and magnesium chloride vapors to the cold reactor lid. The most readily available type of insulation which will perform satisfactorily is silica insulating brick. The insulating material must be free of water and must not react with the magnesium or magnesium chloride vapors.

When the reaction is initiated, there is a pressure drop in the apparatus due to absorption of hydrogen by titanium. Accordingly, a gage pressure of 2–5 pounds hydrogen is maintained to prevent a partial vacuum which could draw air into the reactor. A continuous bleed, throttled through the oil bubbler, relieves any pressure increase occurring during the initial heating period, thus maintaining a constant pressure in the reactor. Heating the reactor is accomplished in any suitable manner such as electrical heating coils, direct heat, or a furnace.

EXAMPLE 1

389 grams of minus 325 mesh rutile, 261 grams granulated magnesium and 89 grams of shredded magnesium chloride were intimately mixed and placed in the mild steel liner. The liner was placed in the reactor with water-cooled, vacuum tight cover. The reactor was evacuated and back-filled with hydrogen, then rapidly heated to the melting temperature of magnesium (651° C.) at which point the magnesium began to react and autogenously raised the charge temperature to 1200–1300° C. The reaction mixture was then allowed to "soak" for an additional 24 hours at 750° C. to insure a complete reaction.

After cooling, the product which was very friable was easily loosened from the liner, removed and crushed to minus ¼ inch to facilitate leaching. The product was then leached in 1500 ml. of water and 1656 ml. of concentrated hydrochloric acid. The acid was added slowly to the slurry to control the solution pH and temperature. The leaching step removed the unreacted magnesium metal, magnesium oxide, and magnesium chloride. The slurry was filtered and the desired product washed free of water soluble salts and dried.

A 245 gram sample of the leached product was analyzed, the results are given in Table 1.

A second sample of the leached product was sintered under vacuum (less than 10 microns) at a temperature of 900° C. for a period of 4 hours and the product, weighing 232 grams, was analyzed. Results are shown in Table 1.

70 grams of the sintered product was then melted under argon and sampled with the results again shown in Table 1.

Table 1

|                | Ti   | Fe   | V    | Si   | Mg   | O    | H     |
|----------------|------|------|------|------|------|------|-------|
| Leached metal  | 88.1 |      |      |      | 1.3  | 2.27 | 3.3   |
| Sintered metal | 92.5 | 1.81 | 0.83 | 0.16 | 0.45 | 2.23 | <0.01 |
| Melted metal   | 92.3 |      |      |      | 0.07 | 1.70 | <0.01 |

It will be noted particularly that the value of the oxygen content is quite low and in fact approaches the theoretical value of 1.90 (determined by the partial molar free energy of the oxygen) for titanium formed by reduction with magnesium.

EXAMPLE 2

In order to demonstrate the important factors involved, a series of six runs were made to compare the effects of magnesium chloride flux and different atmospheres. In this series only the sintered products were analyzed. Each run was made with 400 grams of minus 325 mesh rutile and 267 grams of granulated magnesium with atmosphere and flux additions as well as results being shown in Table 2. Other operating conditions were the same as those of Example 1, except that the sintering temperature was 1000° C.

Table 2

| Run No. | $MgCl_2$, percent of rutile wt. | Atm.  | Ti    | Fe   | Mg   | O     |
|---------|---------------------------------|-------|-------|------|------|-------|
| 1       | 10                              | A     | 90.22 | 0.88 | 0.64 | 4.91  |
| 2       | None                            | A     | 73.28 | 0.50 | 1.07 | 21.62 |
| 3       | 10                              | $H_2$ | 91.01 | 1.52 | 0.49 | 4.24  |
| 4       | None                            | $H_2$ | 90.22 | 0.88 | 0.46 | 5.11  |
| 5       | 30                              | A     | 91.80 | 0.76 | 0.50 | 4.13  |
| 6       | 30                              | $H_2$ | 92.71 | 1.39 | 0.27 | 2.77  |

EXAMPLE 3

Two larger scale reductions were made in which 8.57 and 17.14 pounds of minus 325 mesh rutile were reduced with 110 percent of the theoretical magnesium and 25 percent of the rutile weight as magnesium chloride. These charges were furnaced at 1,000° C. for 16 to 18 hours under a hydrogen atmosphere of 3 p.s.i.g. After leaching and drying the two products were combined and sintered for 24 hours under vacuum at 1,000° C. The following table shows analysis of the products.

Table 3

|                | Ti    | O    | Fe   | Mg   | V    |
|----------------|-------|------|------|------|------|
| Leached metal  | 88.26 | 2.37 |      | 1.24 |      |
| Sintered metal | 92.53 | 2.76 | 1.68 | .39  | 0.38 |

It will be seen that optimum results (oxygen content below 3.0%) are obtained with a combination of hydrogen and flux with the latter present in concentration of about 25 to 30 percent of the weight of the rutile.

Granulated magnesium is employed in the reduction to speed the reaction; if reaction speed is not critical the magnesium could be employed in other forms such as ingots. The amount of magnesium employed must be over the stoichiometric value but a large excess would be wasteful. A 10 to 15% by weight excess is usually a practical amount to use.

Sodium or calcium chlorides may be substituted for the magnesium chloride as the flux. Lower melting fluxes containing mixtures of calcium, magnesium and sodium chlorides may also be used. The flux may be used in the form of a salt bath into which a basket containing the magnesium and rutile can be immersed.

With a long soaking time the rutile can be used in its natural state without grinding, shorter periods may require grinding. Where high purity is desired pigment grade rutile can be used.

Hydrogen pressure can also be varied and increased to shift the composition of the intermediate product closer to $TiH_2$ for cases where such an intermediate results in a superior final product.

Sintering under a purge of inert gas may be substituted for vacuum sintering.

An alternative heating procedure which may be employed consists of heating the reactor to about 550° C. and soaking at that temperature for twelve hours before raising the temperature—this permits most of the reaction to occur without a surge in temperature. The charge is then allowed an additional soaking period at elevated temperature as described in Example 1.

Leaching of the magnesium oxide and unreacted magnesium metal is usually accomplished with either hydrochloric or sulfuric acid. The total amount of acid used is just slightly greater than the stoichiometric for solubilizing the magnesium. A large amount of heat is evolved during the leaching and the acid is added slowly until the pH is between 1 and 3. An excess of acid should be avoided as it may dissolve part of the desired product.

The leaching has also been accomplished without loss of titanium by using an excess of sulfurous acid, an excess of acetic acid or a buffered system using both acetic and hydrochloric acids. The magnesium chloride flux is soluble in the leach solutions.

Though rutile, one of the more refractory forms of titanium oxide, is employed in the examples, other forms of the oxides such as those derived from titaniferous slags and ilmenites (after treatment for removal of impurities) and pigment grade titanium oxide can be used in the process of the invention.

The specific reactor apparatus may, of course, also be varied widely without departing from the essential spirit and scope of the invention.

What is claimed is:

1. A method for the preparation of impure titanium metal from titanium oxide comprising reacting at elevated temperature in an atmosphere of hydrogen a mixture of (1) titanium oxide, (2) magnesium metal, and (3) a flux from the group consisting of magnesium chloride, sodium chloride, calcium chloride and mixtures thereof; to form a product comprising magnesium oxide, unreacted magnesium and a titanium alloy containing hydrogen, magnesium and a small amount of oxygen; leaching the product with acid to remove the magnesium oxide, flux and unreacted magnesium and subsequently sintering the leached product under vacuum at a temperature of from about 700° to 1000° C. to remove the hydrogen and alloyed magnesium.

2. Method of claim 1 in which the titanium oxide is rutile.

3. Method of claim 1 in which the magnesium metal is granulated and is employed in an amount of 10 to 15 percent by weight excess of the stoichiometric value.

4. Method of claim 1 in which the flux is magnesium chloride.

5. Method of claim 4 in which the flux is shredded magnesium chloride.

6. Method of claim 1 in which the reaction mixture is rapidly heated to the melting temperature of magnesium which then reacts and autogenously raises the temperature of the reaction mass to 1200–1300° C.

7. Method of claim 1 in which the reaction mixture is heated to 550° C. and held at that temperature for a period of about twelve hours.

8. Method of claim 6 in which the reaction mixture is subsequently held at about 750° C. for an additional period of about 24 hours.

9. Method of claim 7 in which the reaction mixture is subsequently held at about 750° C. for an additional period of about 24 hours.

10. Method of claim 1 in which the product is leached with dilute hydrochloric acid.

11. Method of claim 1 in which the sintering temperature is about 900° C.

12. Method of claim 1 in which the proportion of the flux is about 25 to 30 weight percent based on the weight of the titanium oxide.

References Cited in the file of this patent

UNITED STATES PATENTS

| | | |
|---|---|---|
| 2,427,338 | Alexander | Sept. 16, 1947 |
| 2,584,411 | Alexander | Feb. 5, 1952 |
| 2,707,679 | Lilliendahl et al. | May 3, 1955 |
| 2,834,667 | Rostron | May 13, 1958 |
| 2,904,428 | Doan | Sept. 15, 1959 |
| 2,905,547 | Voblin | Sept. 22, 1959 |

FOREIGN PATENTS

| | | |
|---|---|---|
| 577,109 | Canada | June 2, 1959 |